Aug. 23, 1932.    G. J. MEYER    1,873,845
LOADING MEANS FOR BOTTLE CLEANING MACHINES
Filed Feb. 25, 1929    5 Sheets-Sheet 1

WITNESSES

INVENTOR

ATTORNEY

Aug. 23, 1932. G. J. MEYER 1,873,845
LOADING MEANS FOR BOTTLE CLEANING MACHINES
Filed Feb. 25, 1929 5 Sheets-Sheet 3

WITNESSES
M. E. Downey
Irving J. Rose

INVENTOR
George J. Meyer
By R. S. Caldwell
ATTORNEY

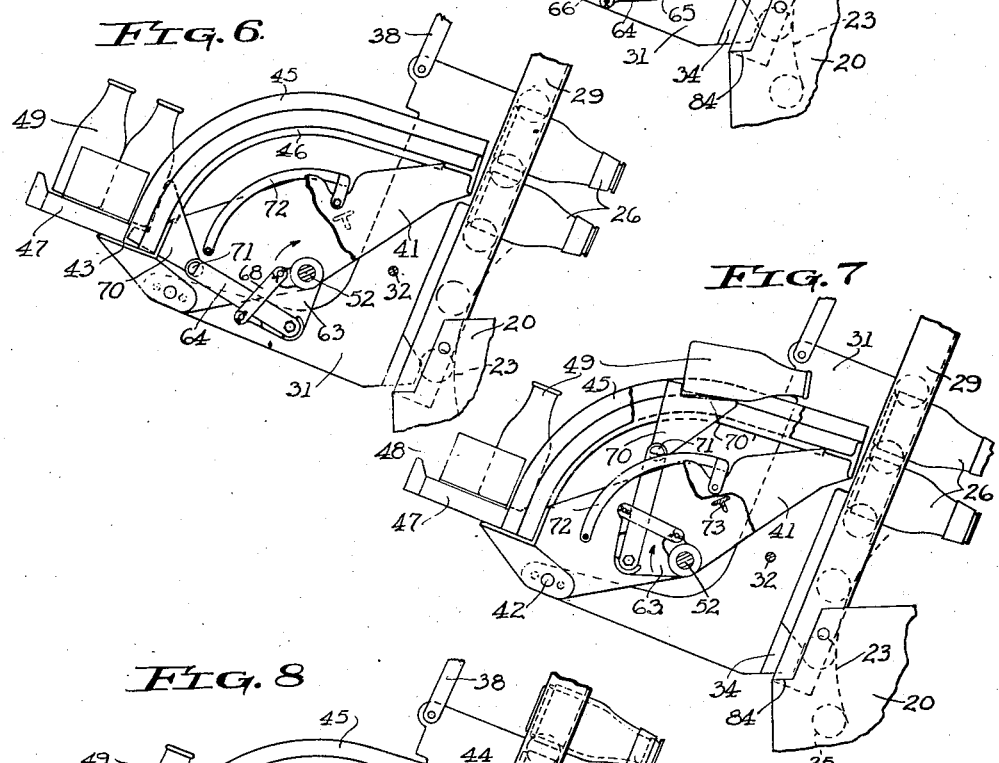

Aug. 23, 1932.  G. J. MEYER  1,873,845
LOADING MEANS FOR BOTTLE CLEANING MACHINES
Filed Feb. 25, 1929  5 Sheets-Sheet 5
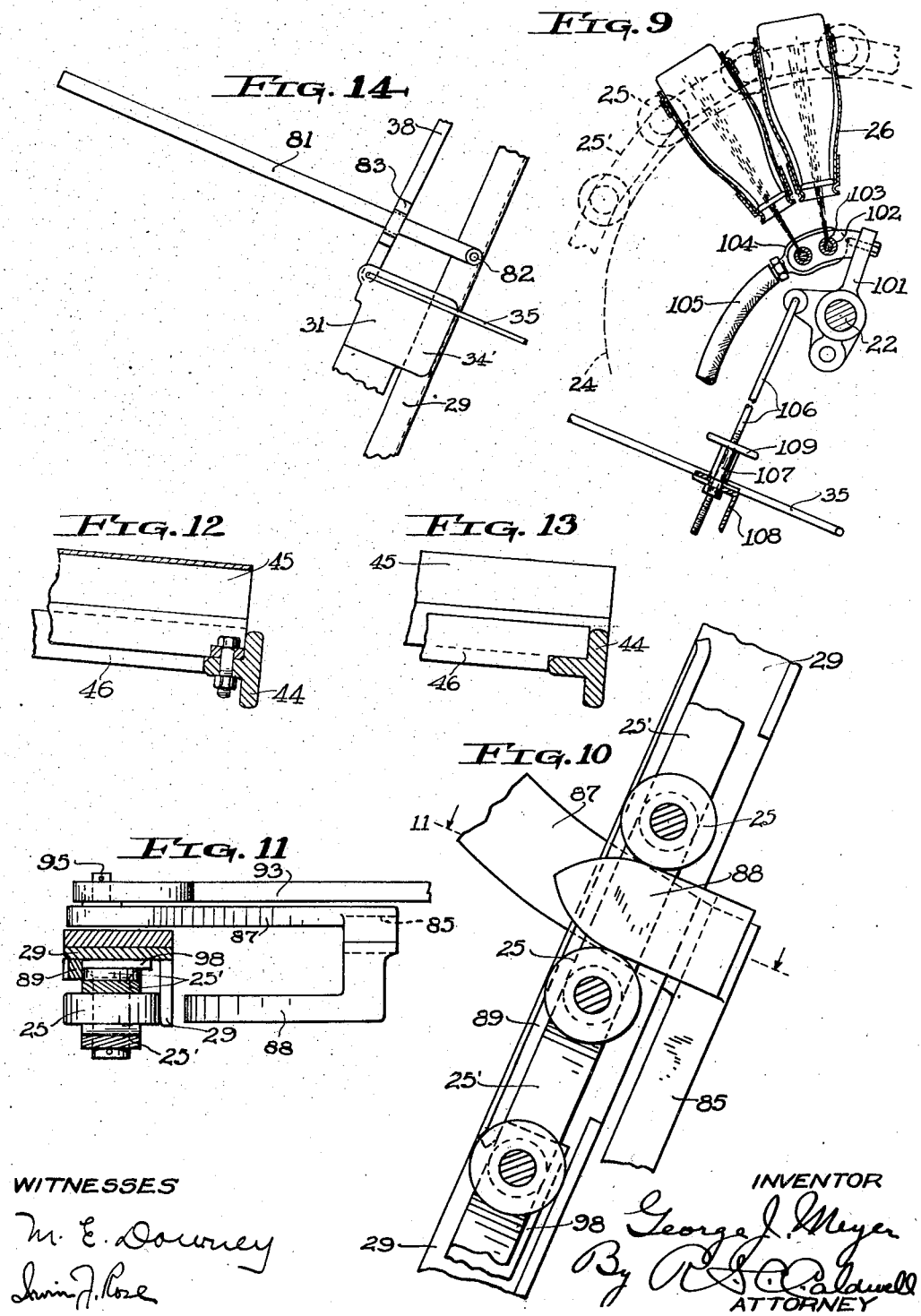

Patented Aug. 23, 1932

1,873,845

UNITED STATES PATENT OFFICE

GEORGE J. MEYER, OF MILWAUKEE, WISCONSIN, ASSIGNOR TO GEO. J. MEYER MANUFACTURING COMPANY, OF CUDAHY, WISCONSIN, A CORPORATION OF WISCONSIN

LOADING MEANS FOR BOTTLE CLEANING MACHINES

Application filed February 25, 1929. Serial No. 342,529.

The invention relates to loading means for bottle washing machines.

An object of the invention is to provide bottle loading means of a character permitting the rapid delivery of bottles to a conveyor of a high capacity bottle washing machine.

Another object of the invention is to provide bottle loading means including bottle-receiving troughs and impelling members which move the bottles along the troughs in bottle-loading direction and which in their reversely directed travel are retracted from the bottle troughs.

A further object of the invention is to provide bottle loading means including a loading table adapted to receive a plurality of bottles in tandem relation to facilitate the work of the operator.

A further object is to provide a bottle loading support which is arranged adjacent a bottle conveyor including pockets receiving bottles from the support, and which is movable along the bottle conveyor in its direction of travel to permit the registration of the support with the conveyor regardless of changes in the position of the bottle pockets by reason of stretch in the conveyor or other conditions.

A further object is to provide means for automatically registering the pockets of an intermittently movable bottle conveyor with the bottle-discharging portions of the bottle support.

A further object is to secure such registration by a locating member engaging the chain of the bottle conveyor.

A further object is to provide a bottle loading table which is slidably movable on the supporting means for the bottle conveyor to permit the registration of the bottle loading table with respect to the conveyor.

A further object is to provide a loading table including arcuate upwardly-convex bottle-receiving troughs along which the bottles are moved from a substantially upright position to a recumbent position in which they enter the bottle conveyor, and preferably in a downwardly inclined position in which they will descend by gravity into the conveyor.

A further object is to yieldingly mount the bottle-receiving portions of the loader to permit their upward movement by bottles or other objects accidentally present in the returning flight of the bottle conveyor moving past the loading station.

A further object is to perfect details of construction generally.

The invention further consists in the several features hereinafter set forth and more particularly defined by the annexed claims.

In the accompanying drawings, Fig. 1 is a side elevation of a bottle loading mechanism embodying the invention;

Fig. 5 is a schematic sectional elevation of the loading device showing the bottle impelling mechanism in its fully retracted position;

Fig. 6 is a similar view showing the bottle impelling mechanism in position ready to move a bottle;

Fig. 7 is a similar view showing the bottle being moved along one of the guide troughs;

Fig. 8 is a similar view showing the bottle impelling mechanism in a returning position;

Fig. 9 is a detail sectional view taken on the line 9—9 of Fig. 2, showing the rinsing means;

Fig. 10 is a detail sectional elevation showing the engagement of a locating dog with the bottle conveyor chain;

Fig. 11 is a detail sectional view taken on the line 11—11 of Fig. 10 but showing the dog out of operative engagement with the conveyor chain;

Fig. 12 is a detail sectional view showing the connection of a bottle trough member with a supporting bar;

Fig. 13 is a similar view showing the connection of another trough member with the supporting bar; and Fig. 14 is a fragmentary detail elevation of a manually-operated means for displacing the loading device with respect to the conveyor, the locating dog for the conveyor being omitted.

Figure 3:
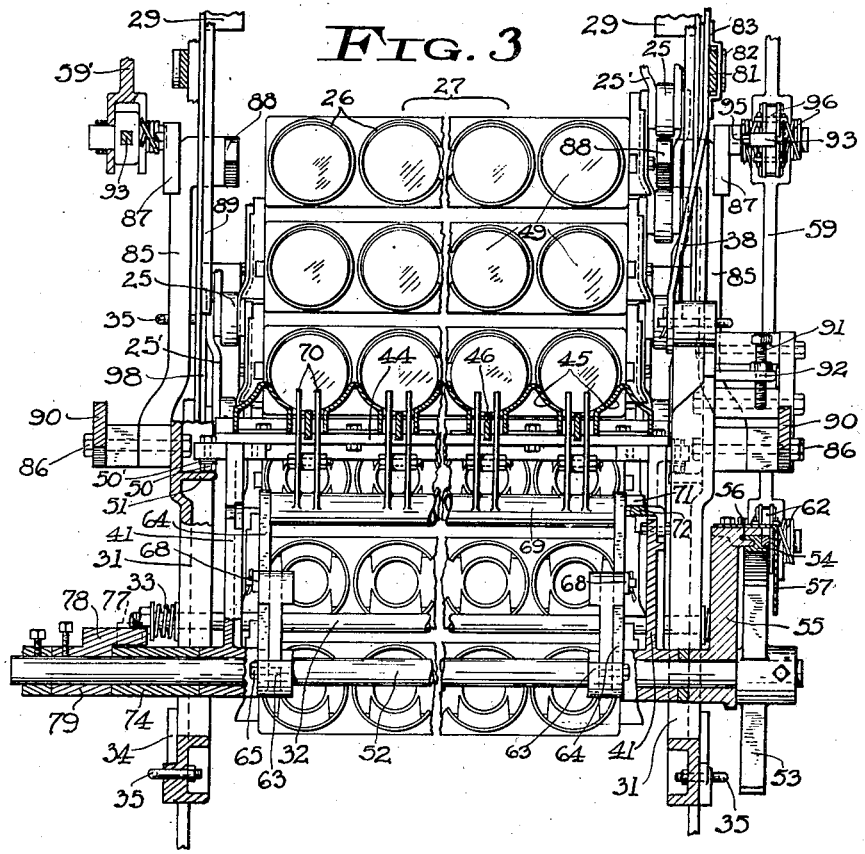
Fig. 3 is a transverse sectional view of the machine taken on the line 3—3 of Fig. 1.

In these drawings, the numeral 20 designates the frame of a bottle washing machine or the like, the front or loading end only being shown. A horizontally-disposed shaft 21 extends transversely of the frame near the lower forward portions thereof and is journalled in the opposite side members of the frame. Another horizontally-disposed shaft 22 parallel to the shaft 21 extends transversely of the upper portions of the frame and is journalled in the opposite side members thereof, the upper shaft 22 being disposed rearwardly of the lower shaft 21. Conveyor-guiding wheels 23 are carried on the end portions of the shaft 21 within the side members of the frame and other guide wheels 24 are carried on the shaft 22 in a similar relation. The peripheries of the guide wheels 23 and 24 are engageable by the rollers 24 of a pair of spaced conveyor chains 25', which support thereon transversely-extending rows of bottle-holding pockets 26, as seen in Fig. 3, to form an endless bottle conveyor 27.

The return empty flight of the bottle conveyor on its way to the loading station is carried on angle tracks 28 disposed along the bottom of the machine. An inclined upwardly-moving flight of the bottle conveyor extends between the guide wheels 23 and 24, and the chain rollers in this flight are supported on a pair of inclined flanged track members 29 fixedly secured at opposite sides of the frame 20. The movement of the bottle conveyor is effected in any well known manner and the travel of the conveyor may be either intermittent or continuous, according to conditions.

A loading device 30 includes opposite end frames 31 which are connected in any suitable manner, as by means of a rod 32 carrying compression springs 33 at its ends by means of which lower and upper ears 34 and 34' on the frames 31 are urged into frictional engagement with the outer sides of the track members 29. Each frame 31 is pivotally carried on the outer ends of spaced parallel struts 35, which have their inner ends pivotally secured to the frame of the machine, thus forming a parallelogram linkage. A U-shaped bar 36 is arranged in substantially horizontal position at the upper portion of the machine frame and has its legs pivotally mounted on aligned pivot pins 37 secured to opposite sides of the frame. Links 38 and 39 are connected between the loading device frames 31 and the forward portions of the pivoted U-shaped bar 36, and the rearward portions of the bar are provided with counterweights 40 to thus counterbalance the weight of the movable loading device. The link 39 may include an adjusting turnbuckle 39'.

Figure 4:
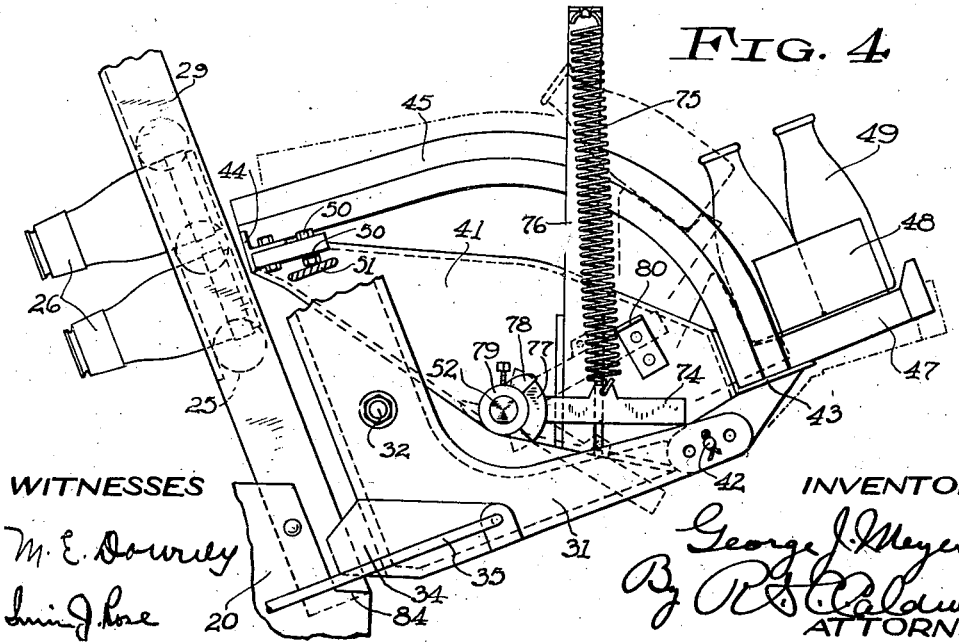
Fig. 4 is a fragmentary elevation of the loading device at the end opposite to that seen in Fig. 1, parts being broken away and parts being shown in section.

A pair of swinging frames 41 are pivotally mounted at the forward end portions of the frames 31 by means of pins 42 and these frames 41 are disposed adjacent the inner faces of the respective frames 31. The frames 41 are connected at their forward portions by a transversely-extending flanged bar 43 and at their upper rearward portions by a transversely-extending T-bar 44, as indicated in Fig. 4. The transversely-extending bars 43 and 44 have secured thereon, as by welding or other suitable means, the opposite end portions of a plurality of spaced arcuate trough members 45 which are convex upwardy, and trough members forming bottle-receiving troughs between them which, at their rearward discharge ends, are adapted to register with the bottle-holding pockets 26. The trough members may be conveniently formed of heavy sheet metal pressed to the inverted V-shaped cross-section seen in Fig. 3. An arcuate guide bar 46 of the same general configuration as the trough members is arranged between each pair of trough members and is secured at its ends to the transversely-extending bars 43 and 44. A pair of guide slots is thus formed between each pair of trough members to receive therein bottle-moving members, as hereinafter described. A transversely-extending inclined platform 47 is secured along the transversely-extending bar 43 and is provided with upstanding partitions 48 forming between them a plurality of compartments registering with the bottle-receiving troughs formed between the trough members 45. Each compartment on the platform 47 is adapted to receive a plurality of nearly upright bottles 49 in tandem relation, the bottles being urged into the troughs by gravity.

The trough members 45 and the platform 47 together with the end frames 41 and the transverse bars 43 and 44 form a swingable loader table which is pivotally mounted on the pins 42, hereinbefore noted. The rearward and upper part of the loader table is adjustably supported by means of a pair of bolts 50 carried on the respective end frames 41 and each including a head projecting inwardly from the adjacent end frame 31. The bolts 50 are preferably provided with adjusting washers 50'. The loader table, by reason of its pivotal mounting, is thus capable of upward movement, as indicated by the dotted line position seen in Fig. 4, when subjected to some abnormal force, such as might be produced by abutment with the loader table of a bottle or other object accidentally retained in the returning flight of the bottle conveyor.

A rock shaft 52 extends transversely of the loader table below the trough members 45 and is journalled in the end frames 41. A sector gear 53 is secured at one end of the rock shaft 52 and meshes with a rack 54 retained in operative engagement with the gear by means of a guide member 55 loosely pivoted on the rock shaft 52, the rack having a tongue and groove engagement 56 with the guide member, as seen in Fig. 3. A guard plate 57 is secured to the guide member to avoid a possible injury to any nearby operator. The rack 54 is provided with a rearwardly projecting rod 58 which has a pivotal connection with the lower end of a lever 59 carried intermediate its ends on a rock shaft 60. The upper end of the lever 59 is pivotally secured to a connecting rod 61, which is periodically operated in any suitable manner. The lower end of the lever 59 is preferably provided with a slip joint device 62 engaging the rack rod 58 in order that the driving connection between the lever and the rack rod will be released upon the occurrence of any abnormal resistance to the movement of the rack rod. However, the lever 59 does not become wholly disconnected from the rack rod 58, since it is slidably supported in a guide member 62' which is pivotally mounted on the lever 59.

The rock shaft 52, extending transversely of the loader table, carries a pair of crank members 63 adjacent the opposite frames 41. Each crank member has an arm 64 pivotally mounted thereon by means of a bolt 65, the arm being capable of limited swinging movement in the plane of the crank member to change the effective radius of the outer end of the arm with respect to the axis of the rock shaft. The arm is limited in such movement by its edgewise engagement with spaced abutments 66 and 67 formed on the crank member, and is guided against lateral movement by its disposition in a slot formed between one face of the crank member and a short bar 68 secured to the crank member. The outer ends of the arms 64 are fixedly connected to a transversely-extending bar 69 on which are mounted a plurality of spaced bottle-moving fingers 70 arranged in pairs, as seen in Fig. 3. The fingers 70 are adapted to extend into the slots formed between the trough members 45 and the interposed bars 46 and are provided with extensions 70' engageable with the side walls of the bottles to minimize the frictional engagement between the bottles and the trough members. One end of the finger-supporting bar 69 is provided with a lug 71 which is adapted to ride on an arcuate cam member 72 secured to the corresponding end frame 41, the lug being engageable with the outer side of the cam member during the bottle-moving travel of the fingers, as seen in Fig. 7, and on the inner side of the cam member during the retracting movement of the fingers, as seen in Fig. 8. The curved portions of the trough members 45 are arranged on a circular arc having its center on the axis of the rock shaft in order that the fingers 70 may remain in proper relation to the bottles during the bottle-feeding movement. The fingers 70 in their retracted position, seen in Fig. 5, rest on the transversely-extending bar 43, and the fingers are limited in their forward movement by engagement of the arms 67 with a transversely-extending T-bar 73 connecting the frames 41.

An arm 74 is loosely mounted on the end portion of the rock shaft 52 opposite the gear 53 and is urged upwardly by a tensioned coiled spring 75 carried at its upper end on the upper portions of a bracket 76, which is fixedly secured at its lower end to the frame 41. The arm 74 is provided with a lug 77 which is engageable with a lug 78 formed on a collar 79 fixedly secured to the rock shaft 52 for urging the rock shaft in bottle-moving direction during the first part of its rotation. In this manner, the initial lifting movement of the bottles in the troughs is facilitated. The swinging arm 74 is limited in its upward travel by its engagement with a stop bracket 80 secured to the adjacent frame member 41.

The bottle-loading device, as heretofore noted, is movable along the inclined track members 29 to secure registration between the discharge ends of the bottle troughs and the carriers 26 of the bottle conveyor. For manually effecting this displacement of the loading device, a lever 81 is pivotally mounted at one side of the machine on a pivot pin 82 carried on one of the track members 29 and extends loosely through a slot formed between the link 38 and a strap 83 secured to the link, thereby enabling the operator to move the loading device up or down by grasping and moving the free end of the lever. The counterbalanced loading device is retained in adjusted position, as hereinbefore described, by the frictional engagement of the frame members 31 with the track members 29. The loading device is limited in its downward movement by the engagement of the lower ears 34 of the end frames 31 with stop abutments 84 near the lower ends of the track members 29.

In the case of a bottle washing machine including an intermittently-operating bottle conveyor, the loading operation takes place during the pauses in the travel of the bottle conveyor. To insure registration of the bottle carriers with the troughs of the loading device during the transfer of bottles therebetween, a locating dog 85 is pivotally mounted on the outer side of each frame 31 on a pin 86. Each locating dog includes an upwardly-projecting portion arranged rearwardly of the track member 29 and is provided at its upper end with a forwardly-extending horn 87 and a laterally displaced forwardly-extending pointed cam projection 88, which latter is arranged in the plane of the chain rollers 25. The cam projection 88 is adapted to be inserted between successive pairs of rollers of the chain to thereby locate the movable loading device with respect to the then stationary chain. The roller-supporting flange of the track member 29 is cut away in the region of the cam projection, as seen in Fig. 10, to permit the swinging movement of the locating dog, and a guide strip 89 is secured to the inner wall of the side flange of the track member to engage the edges of the chain links and thereby resist displacement of the chain away from the track member. A forwardly-projecting arm 90 is secured to the locating dog to act as a counterweight and to facilitate any necessary manual manipulation of the locating dog. The rearward swinging movement of the locating dog out of operative engagement with the chain is limited by an adjustable stop screw 91 secured in a lug 92 extending laterally from the frame 31.

The periodic swinging movement of the locating dog is effected by a link 93 which has a slotted forward end 94 having a lost motion connection with a pin 95 secured to the horn 87 of the locating dog, the rear portions of the link at one side of the machine having a pivotal mounting with the rocking lever 59, with which it is connected by a slip joint 96. The link 93 also has a sliding connection with the lever 59 which, however, is only effective upon the release of the slip joint, and the rear end of the link is provided with a stop 97 engageable with the lever 59 in order to positively move the link 93 in the event of the release of the slip joint. At the other side of the machine, the corresponding link 93 has a similar connection with a short rocking lever 59' secured to the rock shaft 60.

For centering the bottle pockets on the bottle conveyor with respect to the loading troughs, the inner faces of the side flanges of the track members are provided with wear strips 98 engageable with the outer links of the conveyor chains. These wear strips, which are relatively short, are located in the region of the loading troughs.

Figure 1:
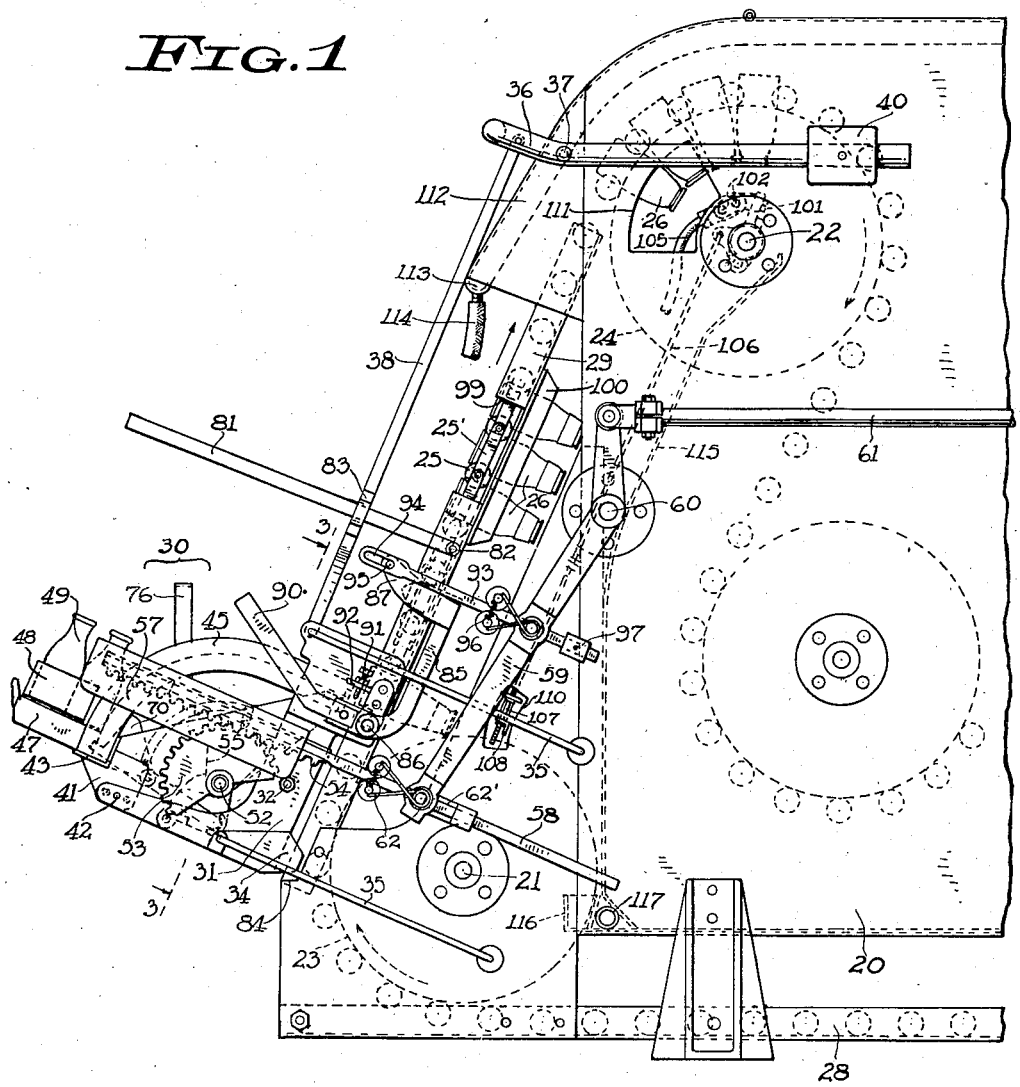
Figure 2:
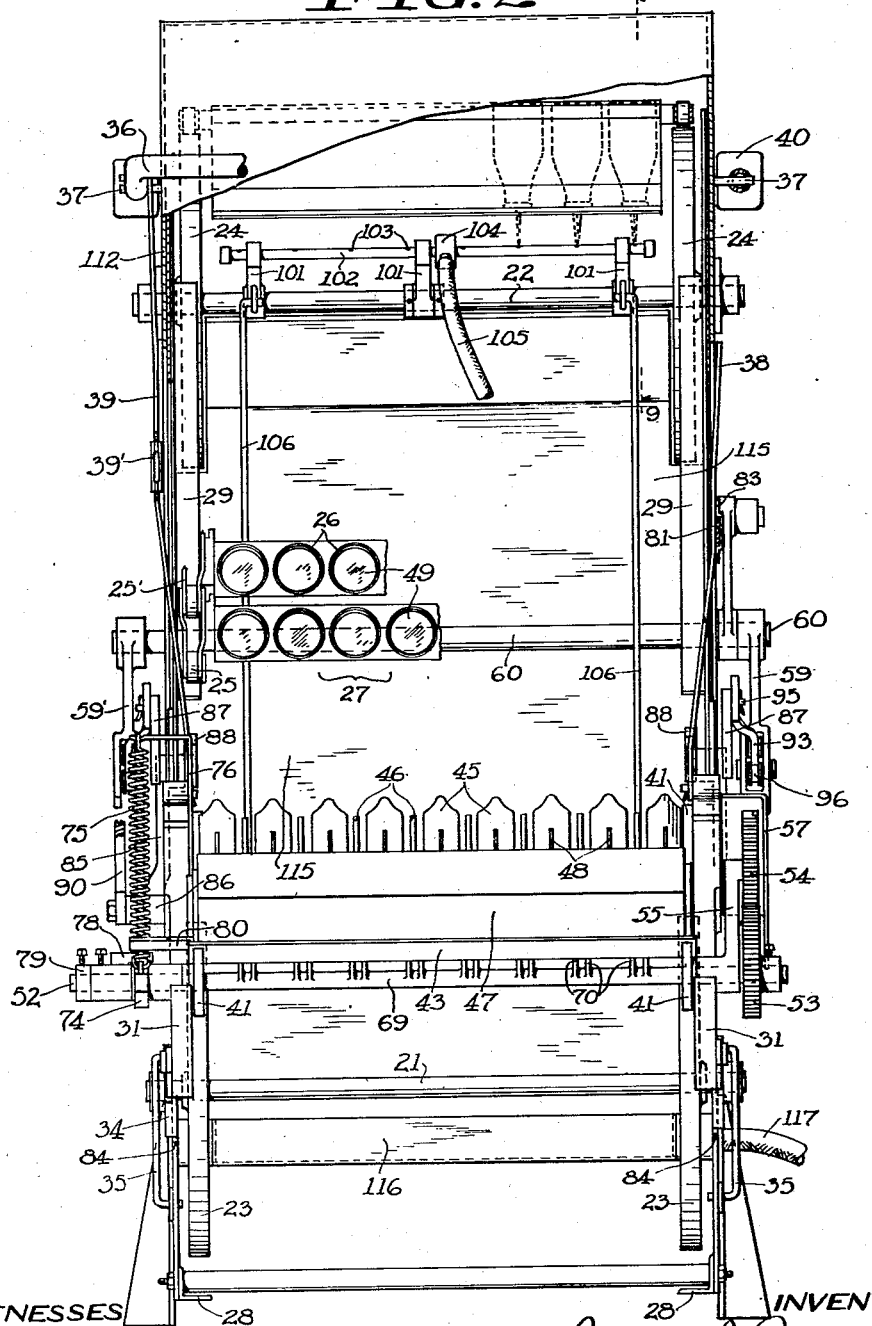
Fig. 2 is an end elevation thereof, parts being broken away and parts being shown in section, and most of the bottle conveyor being omitted.

Above the lever 81 each of the track members 29 has its side flange cut away, as seen in Fig. 1, to provide a chain inspection opening 99, the track member being suitably re-enforced at this region by a flanged member 100 secured to the underface of the track member.

The shaft 22, carrying the wheels 24 about which the bottle conveyor passes at the upper portion of the machine, has a plurality of arms 101 loosely mounted thereon to support a plurality of transversely-extending spray pipes 102 having spray openings 103 formed therein for registration with the inverted bottles in the carriers therebetween. In the present instance, two spray pipes are shown for providing a pre-rinsing spray for the bottles in two adjacent rows of bottle-holding pockets. The spray pipes are connected by a supply fitting 104 to which water is conducted through a flexible hose 105. In order to obtain the proper registration of the spray pipes with respect to the bottles in the superposed carriers, the arms 101 at the ends of the spray pipes are connected by link rods 106, each of which has a threaded lower end screwed into a bushing 107 swiveled in an opening of an angle bar 108 which extends transversely between, and is secured to, the upper struts 35, the bushing being locked against relative rotation on the link rod by means of a wheel nut 109. The angular position of the spray pipe assembly is then determined by the engagement of the locating dogs 85 with the chain rollers, these dogs being mounted on the loading device to which the struts 35 are pivotally connected. The side plates of the frame of the washing machine are provided with openings 110 for receiving therethrough the end portions of the angle bars 108, and other openings 111 are formed in the side walls of the machine adjacent the upper shaft 22 for viewing the pre-rinsing sprays.

The upper portion of the machine is provided with a spray hood 112 carrying a trough 113 at its lower edge along which water may flow off without dropping onto the upwardly-traveling bottles in the conveyor. One end of the trough 113 may be connected to a flexible hose 114, but, if desired, both ends of the trough may be open. The cover portions of the machine and hood may be hinged, if desired, to facilitate access to the interior parts. The rinsing water leaving the bottles is conducted away along a guide wall 115 from which the water flows into a tank 116 disposed near the bottom of the machine, the tank being provided with a laterally-disposed outlet conduit 117.

When the bottle washing machine is to be set in operation, the lever 81 is adjusted by the operator to register the discharge ends of the bottle troughs with respect to the bottle carriers in their momentarily stationary position and the possible movement of the loading device by means of this lever is made sufficiently great to equal at least the pitch of the bottle conveyor pockets. This adjustment is made at a time when the locating dogs 85 are out of engagement with the conveyor chains. In the operation of the machine, the bottle conveyor 27 is moved intermittently in any suitable manner. The rock shaft 60, carrying the levers 59 and 59' at opposite sides of the machine, is periodically rocked by means of the connecting rod 61. Assuming that the bottle moving fingers are in fully retracted position, as seen in Figs. 1 and 5, the lower end of the lever 59 is in its extreme forward position and the rock shaft 52 on the loader device has been rotated counterclockwise to the extreme position seen in Fig. 5. In this position of the rock shaft 52, the fingers 70 rest on the transversely-extending bar 43. In this same position of the lever 59, the links 93 have urged the cam projections 88 of the locating dogs between the rollers of the chains, as indicated in Figs. 1 and 10, thus properly locating the loading device with respect to the bottle conveyor.

The lever 59 on the rock shaft 60 is now swung in a counterclockwise direction (as viewed in Fig. 1) to rotate the shaft 52 on the loading device in a clockwise direction (as viewed in this figure) through the rack and gear connection. The first part of the clockwise rotation of the shaft 52 swings the crank member 63 from the position seen in Fig. 5 to the position seen in Fig. 6. During this swinging movement of the crank members, the fingers 70 are not swung but are projected forwardly in position to engage the bottom of the nearest bottles which have been placed on the platform 47 by the operator. The arms 64 carrying the fingers 70 now engage the abutments 66 on the crank members 63, so that a further clockwise rotation of the rock shaft 52 also swings the fingers 70, which then move bodily with the crank members. In the first part of the swinging movement of the fingers 70, they lift the bottles along the trough members 45, which movement is assisted by the counterbalancing spring 75. In the bottle displacing movement of the fingers 70, the lug 71 bears on the outer face of the cam member 72 in order to maintain the fingers in extended position in engagement with the bottles. The bottles are lifted by the fingers 70 over the highest point of the bottle troughs, as seen in Fig. 7, from which point the bottles descend in inclined position, wholly or partially by the force of gravity, into the bottle carriers with which the discharge portions of the bottle troughs have been registered. At the end of their clockwise movement (as viewed in Figs. 1 and 7) the arms 68 strike the transversely-extending stop bar 73 in which position the fingers 70 have fallen out of the slots between the trough members. At about this point or previous thereto in the cycle of operation, the locating dogs 85 have been withdrawn from the conveyor chains but the loading device remains in position with respect to the conveyor. The rocking lever 59 now swings in the opposite direction which causes the rock shaft 52 to rotate clockwise (as viewed in Fig. 8) thereby returning the fingers 70 to the original position seen in Fig. 5. In this returning movement of the fingers, they are held out of the bottle troughs by reason of the engagement of the lug 71 with the underface of the cam member 72. In this manner, the fingers pass the nearest bottles on the loading platform which have descended by gravity into loading position at the entrance portions of the bottle troughs. During this return movement of the lever 59, the locating dogs 85 are again moved into operative engagement with the conveyor chains which, in the meantime, have been advanced in their travel the distance of one carrier. The cam action of the locating dogs on the rollers serves to lift or lower the loading device in the event that new registration becomes necessary between the bottle troughs and the carriers. The cycle of operation is then repeated for moving the next row of bottles into the succeeding row of bottle carriers.

The pre-rinsing sprays, directed upwardly into the inverted bottles above the shaft 22, are preferably of intermittent character to avoid unnecessary waste of water, but, in some instances, they may be continuous. These sprays will remain registered with the intermittently stationary bottles through the operation of the link rods 106, as heretofore noted.

In the case of a bottle washing machine including a continuously-moving bottle conveyor, the locating dogs 85 are omitted, as seen in Fig. 14, and the position of the loading device is adjusted by the lever 81 to provide registration between the discharge ends of the bottle troughs and the bottle carriers at the moment the transfer of bottles takes place.

The invention provides a bottle loading means which is well adapted for feeding bottles to a high capacity bottle cleaning machine of a type in which a bottle conveyor is either intermittently operated or continuously operated. The bottle-receiving troughs are maintained in accurate registration with the bottle carriers at all times to avoid jamming or other difficulty, and the bottles can be placed on the loading platform in nearly upright position, which facilitates the work of the operator. The loading platform is so arranged that a plurality of bottles can be placed thereon in tandem relation which further facilitates the work of the operator, since it is then not so difficult to keep at least one row of bottles in readiness to be moved along the troughs. The bottle-moving fingers during their retracting movement are withdrawn from the troughs, thus avoiding interference with the bottles on the loading platform. The bottle trough assembly is yieldingly mounted on the displaceable bottle loading device, thus avoiding jamming and damage to the machine. The pre-rinsing sprays, by their co-operation with the loading device, will remain in accurate registration with the bottles regardless of stretch in the conveyor, which may be considerable in amount in the case of a relatively long conveyor.

Since the operation of the loading fingers does not interfere with the placement of the bottles on the loading table, the operator is able to load bottles onto the table at practically all times during the cycle of operation. A further advantage is that the bottles are visible during a large portion of the loading cycle, so that the operator can observe and remove any damaged, uncleanable, or foreign bottles, and since the bottles are placed on the table in nearly upright position, the bottle heads can be readily examined and any chipped or broken bottles removed. The loading table is automatically adjusted in position regardless of wear in the conveyor chain or other parts of the machine, and since the loading table is counterweighted, it can be retained in adjusted position under relatively slight friction. This condition also permits the loading table to be displaced by the locating means with comparatively small effort. By reason of the registration of the rinsing sprays with the bottles in the conveyor, regardless of stretch in the conveyor chain or other conditions, the full effectiveness of the pre-rinsing operation is realized.

While the loading means of the invention is more particularly intended for the loading of bottles, it will be obvious that it is also adapted for loading other similar containers, such as cans, jars, and the like. The loading means can be applied to various types of container-handling machines, such as washers, soakers, and sterilizers.

What I claim as new and desire to secure by Letters Patent is:

1. In a bottle cleaning machine having a traveling bottle conveyor, a bottle-receiving member adjacent said conveyor along which bottles are guided into said conveyor and including a discharge portion disposed in register with said conveyor, means for yieldingly supporting said bottle-receiving member to permit movement thereof in a direction along said conveyor, and means operatively connecting said bottle-receiving member and said conveyor for effecting the registration of the discharge portion of said bottle-receiving member with said conveyor.

2. In a bottle cleaning machine having a traveling bottle conveyor, a bottle-receiving member disposed adjacent said conveyor for the transfer of bottles therebetween, means for yieldingly mounting said bottle-receiving member to permit movement thereof along said conveyor, and means operatively connecting said bottle-receiving member and said conveyor for effecting the registration of said bottle-receiving member with the bottle-carrying portions of said conveyor.

3. In a bottle cleaning machine having a traveling bottle conveyor including a chain, a bottle-receiving member disposed adjacent said conveyor for the transfer of bottles therebetween, means for yieldingly mounting said bottle-receiving member to permit movement thereof along said conveyor, and means including a member intermittently engageable with said chain for effecting the registration of said bottle-receiving member with the bottle-carrying portions of said conveyor.

4. In a bottle cleaning machine having a traveling bottle conveyor including a chain provided with spaced rollers, a bottle-receiving member disposed adjacent said conveyor for the transfer of bottles therebetween, means for yieldingly mounting said bottle-receiving member to permit movement thereof along said conveyor, and means including a member intermittently engageable between adjacent rollers of said chain for effecting the registration of said bottle-receiving member with the bottle-carrying portions of said conveyor.

5. In a bottle cleaning machine having a traveling bottle conveyor, a bottle-receiving member disposed adjacent said conveyor for the transfer of bottles therebetween, means for yieldingly mounting said bottle-receiving member to permit movement thereof along said conveyor, and means including a lever pivotally mounted on said bottle-receiving member and intermittently engageable with said conveyor for effecting the registration of said bottle-receiving member with the bottle-carrying portions of said member.

6. In a bottle cleaning machine having an intermittently traveling bottle conveyor, a bottle-receiving member disposed adjacent said conveyor along which bottles are guided into said conveyor, said bottle-receiving member including a discharge portion disposed in register with said conveyor during the pauses in the travel of the conveyor, means for yieldingly mounting said bottle-receiving member to permit movement thereof along said conveyor, and means including a member intermittently engageable with said conveyor during the pauses in the travel of said conveyor for effecting the registration of said bottle-receiving member with the bottle-carrying portions of said conveyor.

7. In a bottle cleaning machine having a traveling bottle conveyor, a bottle-receiving member disposed adjacent said conveyor and along which bottles are guided into said conveyor, said bottle-receiving member including a discharge portion disposed in register with said conveyor, means for yieldingly supporting said bottle-receiving member to permit movement thereof along said conveyor, means for moving bottles along said bottle-receiving member, means including a member intermittently engageable with said conveyor for effecting the registration of said bottle-receiving member with the bottle-carrying portions of said conveyor, and common operating means for said bottle-moving means and said conveyor-engaging member.

8. In a bottle cleaning machine having a traveling bottle conveyor, a bottle-receiving member disposed adjacent said conveyor and along which bottles are guided into said conveyor, said bottle-receiving member including a discharge portion disposed in register with said conveyor, means for yieldingly supporting said bottle-receiving member to permit movement thereof along said conveyor, means for moving bottles along said bottle-receiving member, means including a member intermittently engageable with said conveyor for effecting the registration of said bottle-receiving member with the bottle-carrying portions of said conveyor, and a periodically swinging member having an operative connection with said conveyor-engaging member and with said bottle moving means.

9. In a bottle cleaning machine having a traveling bottle conveyor, a bottle-receiving member disposed adjacent said conveyor for the transfer of bottles therebetween and including portions adapted to register with the bottle-carrying portions of said conveyor, means for yieldingly mounting said bottle-receiving member to permit movement thereof along said conveyor into registration with the bottle-carrying portions of said conveyor, and means releasable by abnormal pressure on said bottle-receiving member for frictionally retaining said bottle-receiving member in different registered positions with respect to said conveyor.

10. In a bottle cleaning machine having a traveling bottle conveyor, a bottle-receiving member disposed adjacent said conveyor for the transfer of bottles therebetween and including portions adapted to register with the bottle-carrying portions of said conveyor, means for yieldingly mounting said bottle-receiving member to permit movement thereof along said conveyor into registration with the bottle-carrying portions of said conveyor, means for counterbalancing said bottle-receiving member, and means releasable by abnormal pressure on said bottle-receiving member for frictionally retaining said bottle-receiving member in different registered positions with respect to said conveyor.

11. In a bottle cleaning machine having a traveling bottle conveyor, a bottle-receiving member disposed adjacent said conveyor for the transfer of bottles therebetween and including portions adapted to register with the bottle-carrying portions of said conveyor, means including parallel-motion supporting links for yieldingly mounting said bottle-receiving member to permit movement thereof along said conveyor into registration with the bottle-carrying portions of said conveyor, and means for frictionally retaining said bottle-receiving member in different registered positions with respect to said conveyor.

12. In a bottle cleaning machine having a bottle conveyor including side chains and bottle-carrying portions extending between said side chains, track members for supporting said side chains, a bottle-receiving member disposed adjacent said conveyor for the transfer of bottles therebetween and including side frames slidably engageable with said track members for movement therealong to permit registration of said bottle-receiving member with respect to the bottle-carrying portions of said conveyor, and means releasable by abnormal pressure on said bottle-receiving member for retaining said bottle-receiving member in different registered positions with respect to said conveyor.

13. In a bottle cleaning machine having a bottle conveyor including side chains and bottle-carrying portions extending between said side chains, supporting means including track members receiving thereon said side chains, a bottle-receiving member disposed adjacent said conveyor for the transfer of bottles therebetween and including side frames slidably engageable with said track members for movement therealong to permit registration of said bottle-receiving member with respect to the bottle-carrying portions of said conveyor, links pivotally connecting said supporting means and said side frames, and means for releasably retaining said bottle-receiving member in different registered positions with respect to said conveyor.

14. In a bottle cleaning machine having a traveling bottle conveyor, bottle-supporting means disposed adjacent said conveyor and including upwardly-convex trough-forming members along which bottles are guided into said conveyor from a substantially upright position to a recumbent position, a rock shaft extending transversely below said trough-forming members, crank arms carried on said shaft, fingers pivotally carried on said crank arms and having limited swinging movement thereon for changing the effective radial length of said fingers with respect to said rock shaft, said fingers having their outer portions disposed between said trough-forming members for urging bottles therealong toward said conveyor, means for holding said fingers in extended position when swung in bottle-moving direction, means for retracting said fingers from the bottle paths during the returning movement of said fingers, means for operating said rock shaft, and spring means acting on said shaft to facilitate the initial bottle-feeding movement of said fingers.

15. In a bottle cleaning machine having a traveling bottle conveyor, bottle-supporting means disposed adjacent said conveyor and including spaced trough-forming members along which bottles are guided into said conveyor, loading fingers adapted to project between said trough-forming members for moving bottles therealong, said fingers including projecting portions engageable with the ends of the bottles for impelling the bottles and other portions engageable with the sides of the bottles for minimizing the contact of said bottles with said trough-forming members, and means for moving said fingers.

16. In a bottle cleaning machine having a traveling bottle conveyor, a bottle support disposed adjacent said conveyor for the transfer of bottles into said conveyor, a frame on which said bottle support is yieldingly mounted to permit the displacement of said support by abnormal forces acting thereon, and means for yieldingly mounting said frame to permit movement thereof along said conveyor.

17. In a bottle cleaning machine having a traveling bottle conveyor, a bottle support disposed adjacent said conveyor for the transfer of bottles into said conveyor, a frame on which said bottle support is yieldingly mounted to permit the displacement of said support by abnormal forces acting thereon, means for yieldingly mounting said frame to permit movement thereof along said conveyor, and means co-acting with said conveyor for effecting the registration of said bottle support with the bottle-carrying portions of said conveyor.

18. In a bottle cleaning machine having a traveling bottle conveyor including an upwardly moving flight, a bottle support disposed adjacent said conveyor and along which bottles are guided into said conveyor, and means for yieldingly mounting said bottle support to permit its upward displacement by abnormal forces acting from below.

19. In a bottle cleaning machine having a traveling bottle conveyor including an upwardly moving flight, a bottle-receiving member disposed adjacent the upwardly-moving flight of said conveyor for the transfer of bottles into said conveyor, and a supporting frame on which said bottle support is pivotally mounted to permit the upward movement of said support by abnormal forces.

20. In a bottle cleaning machine having a traveling bottle conveyor, bottle-supporting means disposed adjacent a portion of said conveyor and including bottle-receiving troughs along which bottles are guided onto said conveyor, a rock shaft extending transversely below said troughs, crank arms carried on said shaft, fingers pivotally carried on said crank arms and having a limited swinging movement thereon for changing the effective radial length of said fingers with respect to said rock shaft, said fingers having their outer portions disposed in said troughs for urging bottles therealong toward said conveyor, a stationary track for holding said fingers in extended position when swung in bottle-moving direction and for retaining said fingers in retracted position during their returning movement, and means for operating said rock shaft.

In testimony whereof I affix my signature.

GEORGE J. MEYER.